United States Patent [19]

Kumar

[11] Patent Number: 4,731,594

[45] Date of Patent: Mar. 15, 1988

[54] PLANAR ACTIVE COMPONENT MICROWAVE SWITCH MATRIX AND AIR BRIDGE FOR USE THEREWITH

[75] Inventor: Mahesh Kumar, South Brunswick Township, Middlesex County, N.J.

[73] Assignee: General Electric Company, Schenectady, N.Y.

[21] Appl. No.: 646,101

[22] Filed: Aug. 31, 1984

[51] Int. Cl.[4] .............................................. H04Q 1/00

[52] U.S. Cl. .................................... 333/103; 333/104; 333/128; 333/246; 330/277; 330/295; 379/292; 340/825.89; 340/825.91; 307/571

[58] Field of Search ............... 333/104, 101, 103, 246, 333/262, 128, 127, 125, 124, 117, 109; 330/295, 84, 286, 277, 124 R; 343/373, 374; 379/292; 370/54, 58; 307/548, 550, 571, 577; 179/18 GF, 18 GE; 340/825.79, 825.89, 825.9, 825.91

[56] References Cited

U.S. PATENT DOCUMENTS

| | | | |
|---|---|---|---|
| 3,104,363 | 9/1963 | Butler | 333/246 |
| 3,885,167 | 5/1975 | Berglund | 377/57 |
| 4,316,159 | 2/1982 | Ho | 333/104 |
| 4,430,732 | 2/1984 | Saga et al. | 330/295 X |
| 4,682,127 | 7/1987 | Magarshack | 333/103 |

FOREIGN PATENT DOCUMENTS

| | | | |
|---|---|---|---|
| 2612758 | 6/1977 | Fed. Rep. of Germany | 333/109 |

OTHER PUBLICATIONS

"Coupler Crossbar Microwave Switch Matrix", by P. T. Ho et al., 1982 IEEE MTT-S Digest, pp. 329-241.

"The Prediction and Characterisation of Coupling between Transmission Line Structures to Enhance CAD of MMIC GaAs Circuits", by H. J. Finlay et al., Conf. Proc. of the 13th European Microwave Conf, Sep. 5-8, 1983, Nüremberg, W. Germ., pp. 363-368.

"Yield Considerations for Ion-Implanted GaAs MMIC's", by A. P. Gupta et al., IEEE Transactions on Microwave Theory and Techniques, vol. MTT-31, No. 1, Jan. 1983, pp. 16-20.

*Primary Examiner*—Eugene R. Laroche
*Assistant Examiner*—Benny T. Lee
*Attorney, Agent, or Firm*—Henry I. Steckler; Allen LeRoy Limberg

[57] ABSTRACT

A microwave planar switch matrix for selectively connecting various ones of M inputs to N outputs. The switch matrix includes a semi-insulative substrate on one side of which are conductors arranged in rows and columns, the interconnection of the rows and columns forming the intersections of the matrix, a plurality M·N of two-way active power dividers arranged in the rows near each intersection, respectively, and a plurality M·N of two-way power combiners arranged in the columns near the intersections, respectively, and M·N switches selectively connecting respectively one output of the power dividers to one input of the power combiners. Because the power dividers and power combiners utilize active components, net power gain through the matrix is possible. Air bridges separate the row and column conductors at the intersections. At each intersection is a break at one of the row and column conductors, the break being of length at least W where W is the width of the row and column conductors. The other of the conductors has a reduced width portion less than W and of length at least W connected to the width W portions of the conductor by tapered portions on either side of the reduced width. A conductive ribbon bonded between the conductor portions which are broken near the ends thereof forming the gap passes over the narrow width conductor and is of substantially the same narrow width as the narrowed portion of the other conductor.

7 Claims, 5 Drawing Figures

PLANAR ACTIVE COMPONENT MICROWAVE SWITCH MATRIX AND AIR BRIDGE FOR USE THEREWITH

BACKGROUND OF INVENTION

1. Field of Invention

The present invention is concerned with a microwave switch matrix, and more particularly, with a planar switch matrix, one in which all components are on one side of a substrate, and in which an air bridge is used to separate input lines from output lines.

2. Description of Prior Art

U.S. Pat. No. 4,316,159 issued Feb. 16, 1982 to P. T. Ho and assigned to applicant's assignee (hereinafter Ho's patent) discloses a planar microwave switch matrix that is one in which all signal conductors and all components are on one side of a substrate. Although not specifically mentioned in the patent, Ho's original disclosure from which the patent resulted, discloses bond wires where the input and output lines of the matrix cross. The use of bond wires at crossover points is a conventional construction method. Bond wires have been found suitable for frequencies below about 1 gigahertz but less suitable at the higher frequencies because the effect of different length wires is more significant at the higher frequencies and the bond wires are hand assembled Bond wires tend to be of different lengths when the assembly is done by different workers These different length bond wires produce non-uniformity in the operating characteristis from assembly to assembly. Further, the various power dividers and combiners and the switching components are all of passive design such that there is signal power loss in passing through the matrix.

An article entitled "Coupler Crossbar Microwave Switch Matrix" by P. T. Ho et al. (hereinafter Ho's article) published in the 1982 IEEE MTT-S Digest at pages 239–241 discloses a different microwave switch matrix not disclosed in the patent in which input lines are on one side of a substrate while output lines are on the other side of the substrate. Fifty-ohm (50-Ω) feedthrough technology is utilized to connect the lines on two sides of the substrate. That is lines on opposite surfaces of the substrate are connected by a conductor through an orifice in the substrate. It is more difficult to fabricate components and conductors on two sides of a substrate than on one side in a GaAs monolithic microwave integrated circuit form which is the preferred form of realization in the instant invention. GaAs is a fragile material and the substrate thickness is normally 100 micrometers (μm). Moreover, 50-Ω feedthroughs on GaAs substrates are difficult to fabricate. When the circuit is on both sides of a fragile substrate, the packaging of such circuit is difficult. This problem is much less severe in circuits using $Al_2O_3$ (Alumina) substrate (which P. T. Ho has used). Advantages of fabricating circuits on GaAs substrate in monolithic form relative to hybrid circuits fabricated on $Al_2O_3$ substrate are well known. As in the Ho's patent the power dividers and combiners (hybrid couplers) in Ho's article are of passive design although the switches utilize field effect transistors such that overall gain can be achieved by the switch matrix.

H. J. Finlay et al. in an article entitled "The Prediction and Characterization of Coupling between Transmission Line Structures to Enhance CAD of MMIC GaAs Circuits" published in the Conference Proceedings of the 13th European Microwave Conference, Sept. 5–8, 1983 in Nüremberg, W. Germany at pages 363–368 discloses various air bridges without specifying any particular use for them. He concludes on page 364 in the second sentence preceding the section entitled "Comparison of Theories with Measurements" that "the degree of coupling is higher than predicted (low or no coupling is desired). . . due to the proximity of the orthogonal input and output lines". In particular, on page 368 an air bridge is illustrated in FIGS. 10(*a*), 10(*b*) and 11(*b*) which results in about −35 dB coupling (35 dB isolation) at 4 gigahertz. As illustrated in the frequency plot of FIG. 11(*a*). More isolation (on the order of 50 dB) is required for proper operation of a microwave switch matrix used in spot beam communication satellites which is a contemplated use for the instant invention.

SUMMARY OF THE INVENTION

In accordance with a preferred embodiment of the invention a microwave switch matrix for connecting various ones of M inputs to various ones of N outputs comprises in combination a semi-insulative substrate, a plurality of conductors arranged as rows and columns positioned on one side of the substrate with respective ones of the row conductors coupled to respective ones of the M inputs and respective ones of the column conductors coupled to respective ones of the N outputs. The intersections of the rows and columns form the coordinates of the matrix. There are no electrical connections between the rows and columns at the intersections. The matrix further includes a plurality M·N of two-way power dividers each located on the one side of the substrate and a plurality M·N of two-way power combiners each also located on the one side of the substrate. Each power divider comprises active components for preventing signal power loss in passing through the dividers. The dividers each have an input terminal and one output terminal positioned respectively in the row conductors in proximity to the respective M·N intersections. Each of the combiners comprises active components for preventing signal loss to signals passing through the combiner. The combiners each have an output terminal and one input terminal positioned resectively in the column conductors in proximity to the respective M·N intersections. The matrix further comprises a plurality M·N of switches between the respective outputs of the power dividers and respective inputs of the power combiners positioned in proximity to the M·N intersections. In accordance with another embodiment of the present invention an air bridge conductive assembly suitable for passing row and column signal along the row and column conductors at the row and column intersections comprises, in combination, a semi-insulative substrate and a first, second and third linear conductors positioned on one side of the substrate. The first linear conductor is generally of width W but has a portion of uniform reduced width <W and of length at least W and having tapered portions connecting the width W portions to the reduced width portion. The second and third linear conductors are positioned on opposite sides, respectively, of the first conductor and at right angles thereto in line with one another and centered about the reduced width portion of the first conductor, the gap between them being at least W in length centered about the center line of the first conductor. The air bridge assembly further includes a conductive ribbon of width <W bonded between the second and third conductors at the ends thereof which form the gap. The ribbon passes over and is raised above the reduced width portion of the first conductor.

DETAILED DESCRIPTION OF A PREFERRED EMBODIMENT

Figure 1:
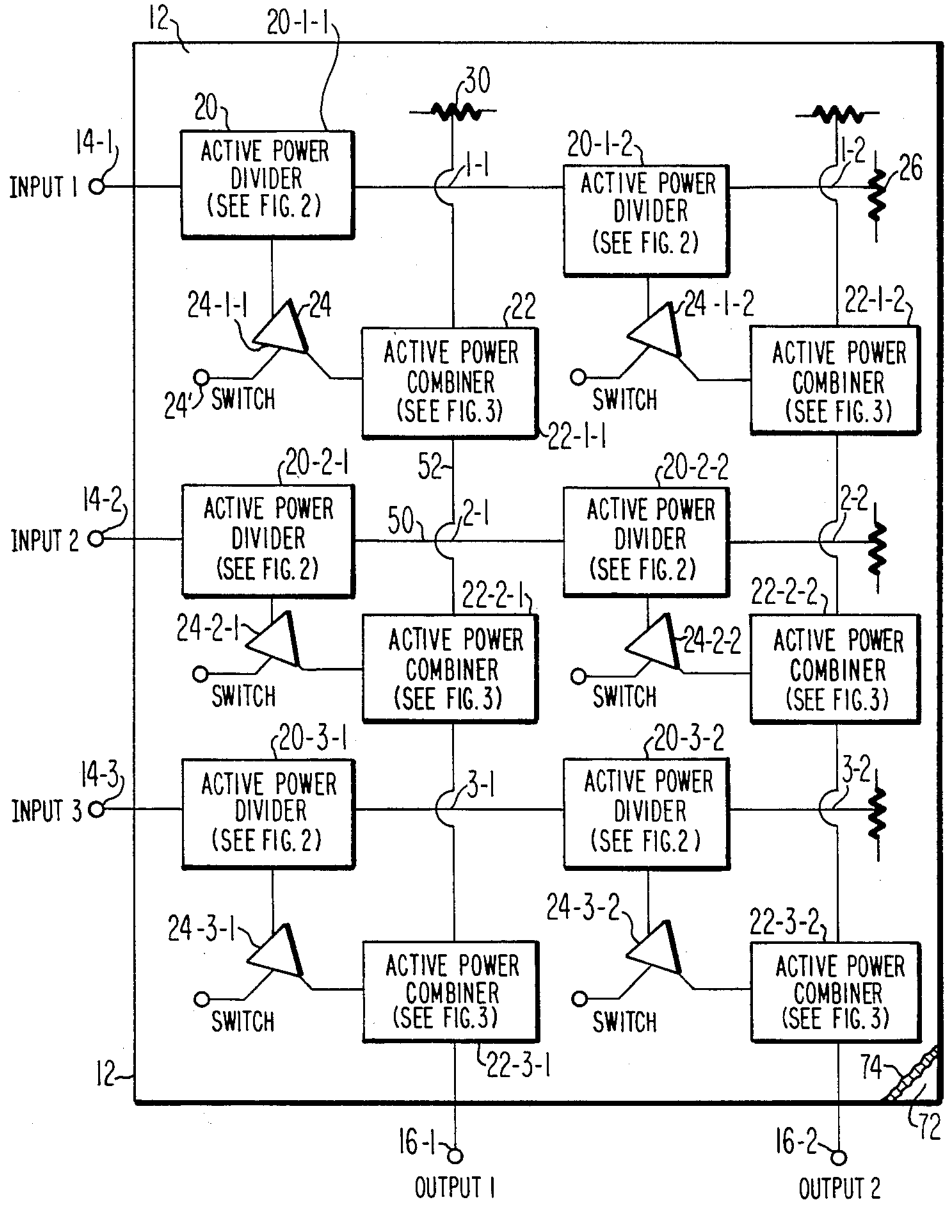
FIG. 1 is a planar 3×2 switch matrix in electrical block diagram form in accordance with a preferred embodiment of the present invention.

Referring to FIG. 1 which illustrates a 3×2 planar microwave switch matrix, all components and conductors except a ground plane are placed on one side of a semi-insulative substrate such as gallium arsenide (GaAs) substrate 12. The switch matrix utilizes monolithic microwave integrated circuit (MMIC) fabrication technology in which all conductors and components are simply formed onto the substrate in a known manner. Situated beneath the substrate 12 is a ground plane 72 revealed beneath broken away portion 74 of substrate 12. The switch matrix is thus constructed utilizing microstrip technology. Although the illustrated switch matrix has three inputs at terminals 14-1, 14-2 and 14-3 and two outputs at terminals 16-1 and 16-2, typically such a switch would have M inputs and N outputs where M and N may range from 2 to 16 or more and M and N may be equal or unequal.

As illustrated in FIG. 1 the input lines can be thought of as rows and the output lines can be thought of as columns though those terms are arbitrarily chosen and the terms "row" and "column" in the claims are not to be limited to any vertical or horizontal orientation. The intersection of the rows and columns form the coordinates of the switch matrix. In FIG. 1 there are 3·2 intersections legended 1-1, 1-2 . . . 3-2 where the left number of each pair corresponds to the row or input line number and the right number of each pair corresponds to the column or output line number. In a general switch matrix there would be M·N such intersections. Associated with each intersection is an inphase power divider such as power divider 20 situated in a row line and an inphase power combiner 22 situated in a column line.

A switch 24, electrically equivalent to a single-pole single-throw switch, is situated between the dividers 20 and combiner 22. Thus associated with intersection 1-1 power divider 20-1-1 is in input line 1 and power combiner 22-1-1 is in output line 1. Switch 24-1-1 connects power divider 20-1-1 to power combiner 22-1-1. In each of power dividers 20, combiners 22 and switches 24 when a specific device is being referred to, the number following the first hyphen refers to the row number and the number following the second hyphen refers to the column number.

Except for the power division ratios, all power dividers illustrated in FIG. 1 are identical and except for the combination power ratios, all power combiners illustrated in FIG. 1 are identical. Each of the input lines and output lines is terminated in its characteristic impedance. These impedances are illustrated as resistances, impedance 26 terminating input line 1 being exemplary. Each output line is terminated in its characteristic impedance. The termination impedance for line 16-1, for example, is 30.

A suitable switch 24 is described in "Dual-Gate MESFET Variable-Gain Constant-Output Power Amplifier" by M. Kumar etal., IEEE Transactions on Microwave Theory and Techniques, Vol. MTT-29, No. 3, Pgs. 135–189. In FIG. 1 of this article, which is a schmatic of the amplifier, the application to the second gate $G_2$ of 0 volts and −3 volts respectively cause the amplifier to provide gain of 10 dB and −30 dB (loss of 30 dB) respectively. Thus the amplifier acts as a single-pole single-throw switch. The reverse gain through switch 24 is −30 dB (loss of 30 dB).

Figure 2:
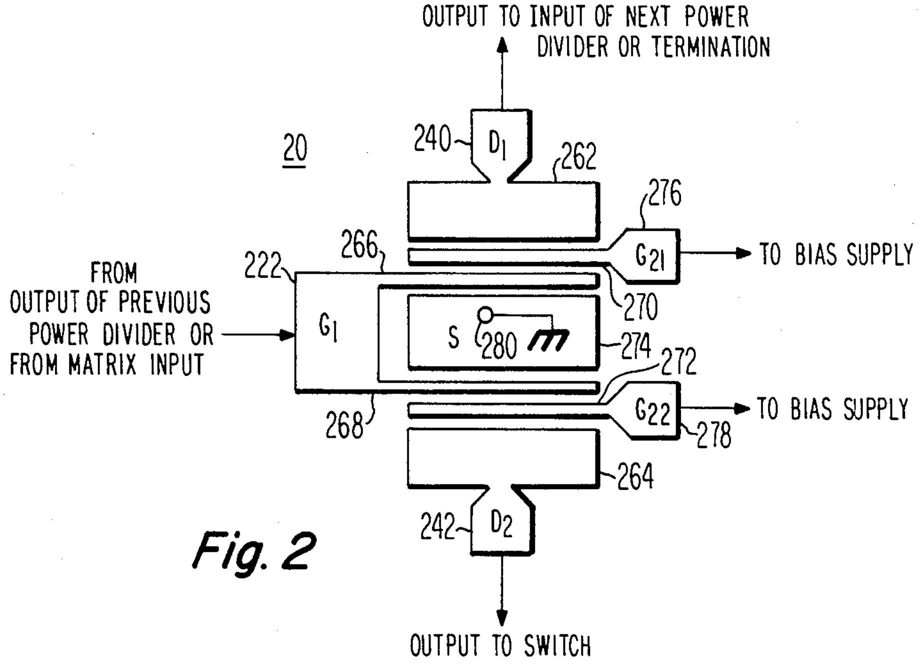
FIG. 2 is the printed circuit pattern for an active a power divider suitable for use in the switch matrix of FIG. 1.

A suitable power divider 20 is as illustrated in applicant's FIG. 2 and as described in detail in U.S Pat. No. 4,611,184 issued 9 Sept. 1986 by M. Kumar and assigned to the common assignee. As illustrated in FIG. 2, to which attention is now directed, the power divider comprises a double dual gate FET. That is, two dual gate FETS share a common source electrode. Double dual gate FET 20 comprises first and second drain electrodes 262 and 264, first, second, third and fourth gate electrodes 266, 268, 270 and 272 and the common source electrode 274.

Gate electrodes 266 and 268 are connected together to a common gate pad 222. Drain electrodes 262 and 264 are connected respectively to drain pads 240 and 242. Source electrode 274 must be connected to circuit ground 72 (FIG. 1). To accomplish that connection a metalized via hole (conductive path) represented by circle 280 is connected to circuit ground 72. Common gate pad 222 is connected to either an output of a previous power divider such as that illustrated in FIG. 2 or to an input terminal such as 14-1 (FIG. 1). The output at drain pad 240 is connected to an input of a next successive power divider such as illustrated in FIG. 2 or to the termination resistor such as 26 (FIG. 1). The output from drain pad 242 is connected to a switch such as 24 (FIG. 1). As described in the aforementioned U.S. Pat. No. 4,611,184, additional components are necessary to realize an operational active power divider but these are well known to those skilled in the art and will not be described herein.

The purpose of the FET power divider of FIG. 2 is to direct power, input at gate pad 222, to output at drain pads 240 and 242 in typically unequal amounts of power output. The fraction of power output at each of pads 240 and 242 is determined by d.c. bias applied to gate pads 276 and 278. When the bias voltages at gate pads 276 and 278 are the same, the power divider of FIG. 2 operates as an equal power divider. By applying different negative value biases to gate pads 276 and 278 the gain of each half of dual FET 260 can be varied, for example, from 10 dB to −35 dB by applying between 0 volts and −4 volts to each of gate pads 276 and 278. The reverse gain is −30 dB (loss of 30 dB) under either condition of bias voltage.

Figure 3:
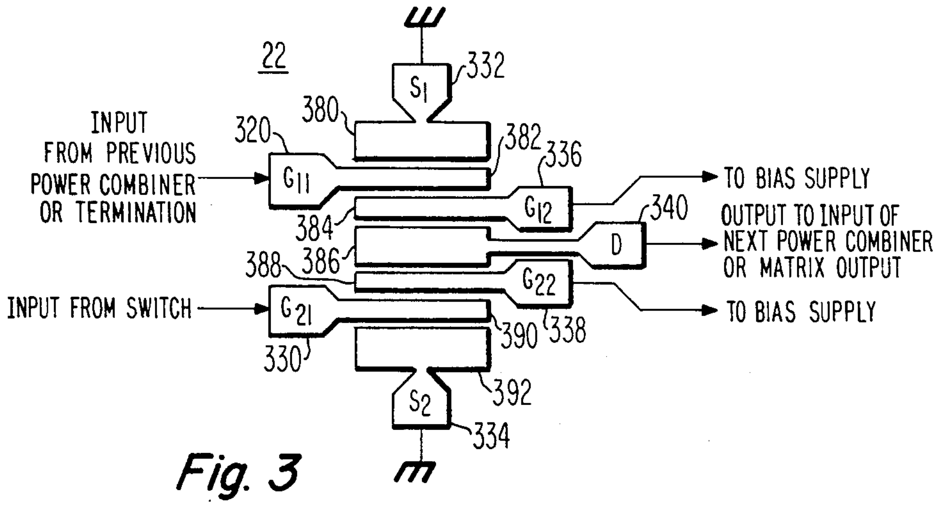
FIG. 3 is the printed circuit pattern for an active power combiner suitable for use in the switch matrix of FIG. 1.

A power combiner useful for power combiner 22 of FIG. 1 is one disclosed in U.S. Pat. No. 4,609,889 issued Sept. 2, 1986 by M. Kumar and assigned to the common assignee. The power combiner as disclosed in the aforementioned patent application is as illustrated in FIG. 3 in the instant application and comprises essentially a double dual gate FET. FIG. 3 illustrates the double dual gate FET as realized in monolithic form as is appropriate for the switch matrix of FIG. 1. The power combiner 22 comprises source electrodes 380 and 392, gate electrodes 382, 384, 388 and 390 and a common drain electrode 386. Source electrode 380 is connected to a grounded source pad 332. First gate electrode 382 is connected to gate pad 320. Gate electrode 384 is connected to gate pad 336. Common drain electrode 386 is connected to drain pad 340. Gate electrode 388 is connected to gate pad 338. Gate electrode 390 is connected to gate pad 330 and source electrode 392 is connected to grounded source pad 334. Gate pad 320 serves as an input from an output of a previous power combiner such as 22 or from a terminating resistor such as 30 (FIG. 1). Gate pad 330 is connected to a switch such as 24 (FIG. 1). Drain pad 340 is connected to an input gate pad 320 of a next succeeding power combiner 22 or to the matrix output such as at terminal 16-1 (FIG. 1).

Bias voltages are applied to gate pad 336 and gate pad 338 corresponding to the relative ratios of power connected to the gate pads 320 and 330. Both halves of the FET have gain, for example, on the order of 10 dB. The reverse gain is −30 dB (loss of 30 dB). If power input to gate 320 is larger than power input to gate pad 330 the voltage supplied to gate pad 336 is more negative than the voltage supplied to gate pad 338 and the voltages are set such that the power levels at the drain pad 340 due to the respective input signals are identical after amplification.

Figure 4:
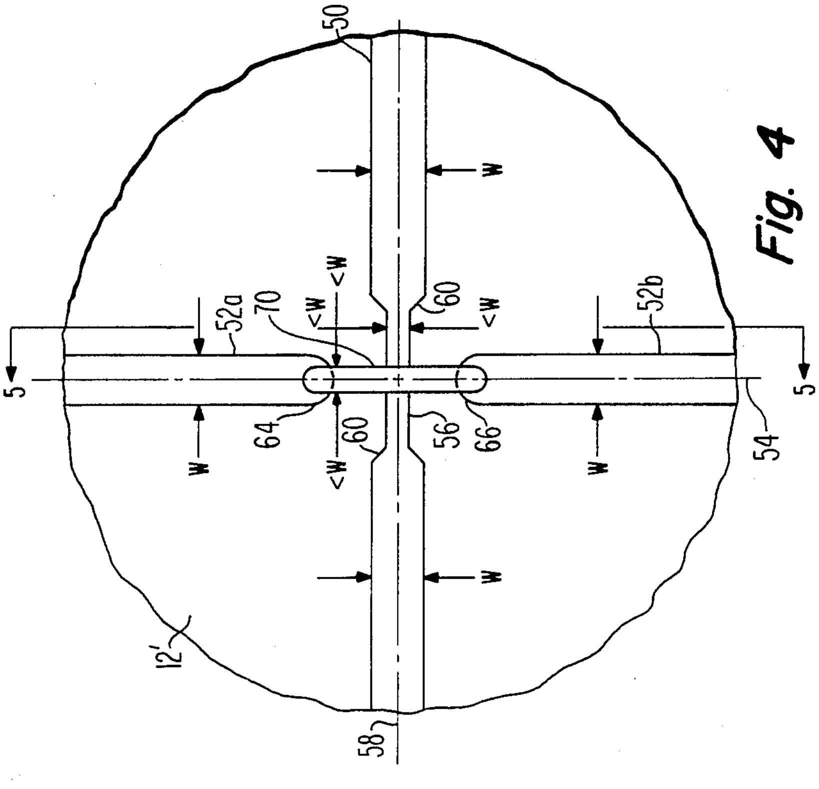
FIG. 4 is an air bridge assembly in accordance with another aspect of the present invention.

In FIG. 1 where each crossover occurs between an input line and an output line such as at 1-1, a physical separation of the conductive paths is necessary. FIG. 4, to which attention is now directed, illustrates an air bridge for accomplishing the separation. A portion 12′ of GaAs substrate 12 of FIG. 1 is illustrated in FIG. 4. Conductor 50 on substrate 12′ corresponds to a conductor with the same number in FIG. 1 at crossover 2-1. Conductive portions 52*a* and 52*b* also on substrate 12′ correspond to conductor 52 in FIG. 1. Conductors 52*a* and 52*b* are in line with one another centered about center line 54. Each of conductors 50, 52*a* and 52*b* is generally of width W. An exemplary W is 78 μm for a 50-Ω microstrip line for a substrate thickness of 100 μm, as can be calculated by using well known techniques. One portion 56 of conductor 50 which is centered about conductor 50 centerline 58 is of width <(less than) W. That portion is at least of a length equal to W (3W at 4 GHz) extending the same distance on either side of conductor 52*a*–52*b* center line 54. Reduced width portion 56 is connected to the rest of conductor 50 by tapered portions 60 of conductor 50 at both ends of reduced portion 56. The tapered portion 60 is simply formed by using a taper, 45° being exemplary. The width of conductor 56 is chosen to be about 70–75Ω such that the discontinuity in impedances of conductors 50 and 56 is small. The length of conductor 56 is chosen to be about 3W at 4 GHz which is less than 1/100th of the wavelength at 4 GHz. Following are the two criterion for selection of length and width of the conductor 56. (1) The width should be such that the coupling capacitance between two lines 56 and 70 at the crossover point is small to provide the isolation of at least 45 to 50 dB and W/3 width provides this isolation at 4 GHz. (2) The length is chosen to be less than 1/100th of the wavelength. This length provides minimum discontinuity such that the VSWR at the input and output ports of conductors 50 or 52 is small, for example, less than 1.1. The ends 64 and 66, respectively, of conductors 52*a* and 52*b* are tapered similar to tapers 60.

Figure 5:
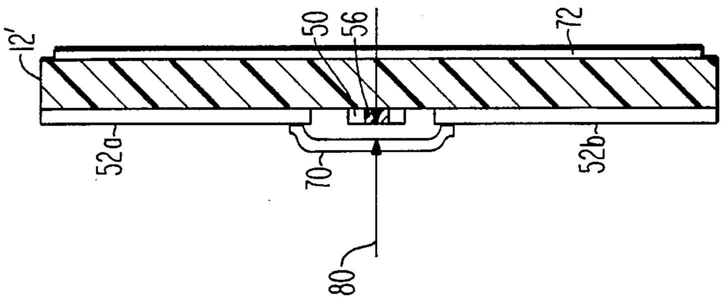
FIG. 5 is a cross section view along lines 5—5 of FIG. 4 of the air bridge assembly.

The gap between end portions 64 and 66 of conductors 52*a* and 52*b* is at least W (3W at 4 GHz) in length and centered about center line 58 for the reasons set forth above with reference to the length of reduced width portion 56. A conductive bridge 70 is bonded to conductors 52*a* and 52*b* at their ends 64 and 66, respectively, thus producing a conductive path between conductors 52*a* and 52*b*. Referring to FIG. 5 the gap 80 between bridge 70 and conductor 56 is at least 3 μm. If the gap is more than 3 μm the isolation will further improve. For example, if the gap is increased to 6 μm the isolation will increase by approximately 3 dB. The normal gap which can be fabricated by monolithic microwave integrated circuit technology is normally of the order of 3–10 μm. Typically the width of bridge 70 is the same as the width of reduced width portion 56 of conductor 50 in FIG. 4, and for the same reasons set forth for determining the width of 56. The thickness of air bridge 70 is 4 to 5 μm, by way of example. The air bridge crossover of two 50-Ω microstrip lines with minimum discontinuity and required isolation is very important in planar fabrication of the switch matrix. The air bridge can be fabricated along with the rest of the circuit on a GaAs substrate in monolithic form. One method of construction is as described in an article entitled "Yield Considerations for Ion-Implanted GaAs MMIC's" by A. P. Gupta et al., IEEE Transactions on Microwave Theory and Techniques, Volume MTT-31, No. 1, Jan. 1983, pp. 16–20. The monolithic microwave integrated circuits by definition require no assembly, bondwires or any kind of external circuit components attached to the circuit. The monolithic circuits are suited for high volume production without requiring any assembly by a technician. The monolithic circuits are more reliable and smaller in size than a hybrid configuration where the circuit is constructed by assembly of the components, such as active devices, microstrip circuit components, capacitors, bondwires, etc. Moreover, bondwire length, height, position, etc. will affect circuit isolation and cause signal discontinuity. These bondwires cannot be precisely assembled to produce repeatability. Further, the length of the bondwire limits the frequency of operation since as the frequency increases, the electrical length of the wire becomes larger compared to the wavelength which is undesirable.

In FIG. 5 ground plane 72 is illustrated on the undersurface of substrate 12′. This conductor is, in fact, under the entire substrate 12 as illustrated in FIG. 1 in the lower right hand corner of the figure beneath broken away portion 74 of substrate 12.

Returning to FIG. 1 the actual power division ratio of each power divider 20 and power combination ratio of each power combiner 22 is set by giving consideration to the number of input lines and output lines, respectively, in the matrix and the position of the power divider and power combiner in the matrix. Further the power dividing ratios and power combining ratios of power dividers 20 and power comoiners 22, respectively, are chosen such that the power appearing at output ports 16-1 and 16-2 are the same reguardless of which path is chosen between any input port 14-1, 14-2 or 14-3 and either output port 16-1 or 16-2, assuming that input power levels at the various ports 14 are the same. As mentioned in connection with FIGS. 2 and 3, the division and combination ratios are affected by the values of gate biases. Thus, for example, power divider 20-1-1 divides in a $\frac{2}{3}$- $\frac{1}{3}$ ratio with $\frac{2}{3}$ of the input power going to the next subsequent power divider 20-1-2 and $\frac{1}{3}$ going to switch 24-1-1. It will be understood that although the $\frac{2}{3}$- $\frac{1}{3}$ ratio is fixed for the particular power divider, because of the amplifying nature of the active power dividers, the total output power may exceed the input power.

The ratio between input power and output power is determined by the values of bias applied to the various gates in the double dual gate FET illustrated in FIG. 2. Power divider 20-1-2 because it is at the end of a line, input line 14-1 in this example, divides in a $\frac{1}{2}$- $\frac{1}{2}$ ratio with half the input power going to terminating resistor 26 and half going to switch 24-1-2. It will, of course, be realized that only $\frac{2}{3}$ of the power input at terminal 14-1 reaches the input of power divider 20-1-2. Thus, only $\frac{1}{3}=\frac{2}{3}\cdot\frac{1}{2}$ of the input power reaches switch 24-1-2, assuming unity gain.

Power dividers 20-2-1 and 20-3-1 have the same $\frac{2}{3}$- $\frac{1}{3}$ power division ratio as does power divider 20-1-1. Similarly, power dividers 20-2-2 and 20-3-2 have the same power division ratios $\frac{1}{2}$- $\frac{1}{2}$ as does power divider 20-1-2.

Power combiners 22-1-1 and 22-1-2 have a combining ratio of $\frac{1}{2}$- $\frac{1}{2}$. The power combiner 22-2-1 and 22-2-2 have a combining ratio of $\frac{1}{3}$- $\frac{2}{3}$. The power combiners 22-3-1 and 22-3-2 have a combining ratio of $\frac{1}{4}$- $\frac{3}{4}$. The first ratio branch (for example $\frac{1}{4}$ branch in $\frac{1}{4}$- $\frac{3}{4}$ ratio of combiner 22-3-1) is connected to the associated switch output and the second ratio branch (for example $\frac{3}{4}$ branch of combiner 22-3-1) is connected to the previous power combiner in the output line. In general a power divider, e.g., 20-1-x nearest to an input terminal has a power division value of $1/(N+1)-N/(N+1)$ where $N$ = the number of output lines. Successive power dividers in successive columns have ratios $1/N-(N-1)/N$, $1/(N-1)-(N-2)/(N-1), \ldots, \frac{1}{2}$- $\frac{1}{2}$. Similar rules apply to the power combining ratios. As with the power dividers the actual ratios are determined by the value of gate biases applied to the two dual double gate FETs illustrated in FIG. 3. Due to the power gain available in the active power combiner circuits, the actual output power may be adjusted by means of gate biases to be greater than the total of the input power.

Operation of the circuit of FIG. 1 is as follows. Different signals from different signal sources (not shown) are applied to terminals 14-1, 14-2 and 14-3, respectively. Any of the three inputs may be connected to either output 16-1 or 16-2 or both outputs 16-1 and 16-2. The actual connection is determined by the settings of the various switches 24, which settings are determined by circuitry (not shown). If, for example, it is desired to connect input terminal 14-1 to output terminal 16-1 then switch 24-1-1 is activated by application of an appropriate signal at its control terminal 24'. Similarly, if, for example, it is desired to connect input line 14-3 with output line 16-2 then switch 24-3-2 is activated, causing power to be sent from input terminal 14-3 through power divider 20-3-1, through power divider 20-3-2, through switch 24-3-2 and power combiner 22-3-2 to output line 16-2. Because of the construction of the air bridges as described in connection with FIGS. 4 and 5, a very high degree of isolation from one output line to another results. In an exemplary constructed system an isolation of 45 dB was obtained at 4 GHz with a normal line (50 and 52) width W of 78 $\mu$m and line 56 of reduced width $<$W of 25 $\mu$m and the length of reduced width line 56 of 200 $\mu$m. The separation 80 is 3 $\mu$m.

A second potential leakage path exists, that through a switch 24. As mentioned previously, the reverse isolation of each power divider 20, power combiner 22 and switch 24 is on the order of 30 dB. Therefore the total isolation through this path is on the order of 90 dB.

What is claimed is:

1. An air bridge conductive assembly suitable for passing row and column signals along the row and column conductors at the row and column intersections of a switch matrix, comprising in combination:

a semi-insulative substrate;

a ground plane disposed on one side of said substrate;

a first linear row conductor positioned on the other side of said substrate, comprising three seriatum portions, the first and third portions being of width W, the second portion being positioned intermediate said first and third portions and being of uniform reduced width less than W, said second portion being at least of length W, said first linear row conductor further including, at respective ends of said second portion, tapered conductor portions tapering from width W to the width of said second portion;

second and third linear column conductors of width W also positioned on said other side of said substrate and on opposite sides respectively of said first conductor and at right angles thereto, said column conductors being in line with one another and laterally centered about the reduced width portion of said first conductor and forming a gap having a length at least W centered about the center line of said first conductor; and a conductive ribbon of said less than W width bonded between said second and third conductors at the ends thereof forming said gap, said ribbon passing over and being raised above said second portion of said first conductor.

2. A microwave planar switch matrix for connecting various ones of M inputs to various ones of N outputs, comprising in combination:

a semi-insulative substrate;

a ground plane disposed on one side of said substrate;

a plurality of conductors arranged as rows and columns positioned on the other side of said substrate, respective ones of the row conductors being coupled to respective ones of the M inputs, respective ones of the column conductors being coupled to respective ones of the N outputs, the intersections of the rows and columns forming the coordinates of the matrix, said row and column conductors not being electrically connected at said intersections;

a plurality M·N of two-way in phase power dividers, each located on said other side of said substrate, each having an input terminal and first and second output terminals, the dividers being positioned with their respective input terminals and respective first output terminals as part of the row conductors in proximity to respective ones of the M·N intersections;

a plurality M·N of two way in phase power combiners each located on said other side of said substrate, each having an output terminal and first and second input terminals, the combiners being positioned with their respective first input terminals and respective output terminals as part of the column conductors in proximity to respective ones of the M·N intersections;

a plurality M·N of swithes connected between respective second outputs of the power dividers and respective second inputs of the power combiners positioned in proximity to the M·N intersections;

an air bridge conductive assembly suitable for passing row and column signals along the row and column conductors at the row and column intersections, said air bridge comprising:

each of said row conductors being generally of width W but including at each of said M·N intersections a portion of uniform. reduced width less than W being of length at least W, each of said row conductors further including, at respective ends of each said uniform reduced width portion, a tapered conductor portion tapering from width W to the width of said uniform reduced width portion;

each of said column conductors having a gap at the intersection with each said row conductor, said gap being laterally centered about the reduced width portion of said first conductor and at least W in length centered about the center line of said row conductor; and for each column conductor gap, a conductive ribbon bonded to the ends of the column conductor forming said gap, said ribbon passing over and being raised above the reduced width portion of said row conductor.

3. The combination as set forth in claim 2 wherein each of said power dividers comprises a double dual gate field effect transistor (FET), said FET having a common circuit grounded source electrode, two drain electrodes coupled to said first and second output terminals, respectively, two gate electrodes commonly coupled to said input terminal, said two gate electrodes positioned, respectively, between said common source and respective ones of said two drain electrodes, two additional gate electrodes positioned, respectively, between said common source and respective ones of said two drain electrodes, to which bias voltages may be applied, the value of said bias voltges, when applied, corresponding to the fraction of the input power directed to each drain terminal.

4. The combination as set forth in claim 2 wherein each of said power dividers comprises an active component for preventing signal power loss through said divider.

5. The combination as set forth in claim 4 wherein each of said power combiners comprises an active component for preventing power loss to signals passing through the power combiner.

6. The combination as set forth in claim 4 wherein each of said power dividers comprises a double dual gate field effect transistor (FET), said FET having a common circuit grounded source electrode, two gate electrodes commonly coupled to said input terminal, two drain electrodes coupled to said first and second output terminals, respectively, two additional gate electrodes to which bias voltages may be applied, the value of said bias voltages, when applied, corresponding to the fraction of the input power directed to each drain terminal.

7. The combination as set forth in claim 6 wherein each of said power combiners comprises a double dual gate FET, said FET having a common drain electrode connected to said output terminal, first and second source electrodes connected to ground, first and second gate electrodes connected respectively to first and second input terminals and two additional gate electrodes positioned between said common drain and first and second source electrodes, respectively, to which bias voltages may be applied for amplifying the signals applied to said first and second gate electrodes so that equal power is present from the two gates at said drain electrode.

* * * * *